UNITED STATES PATENT OFFICE.

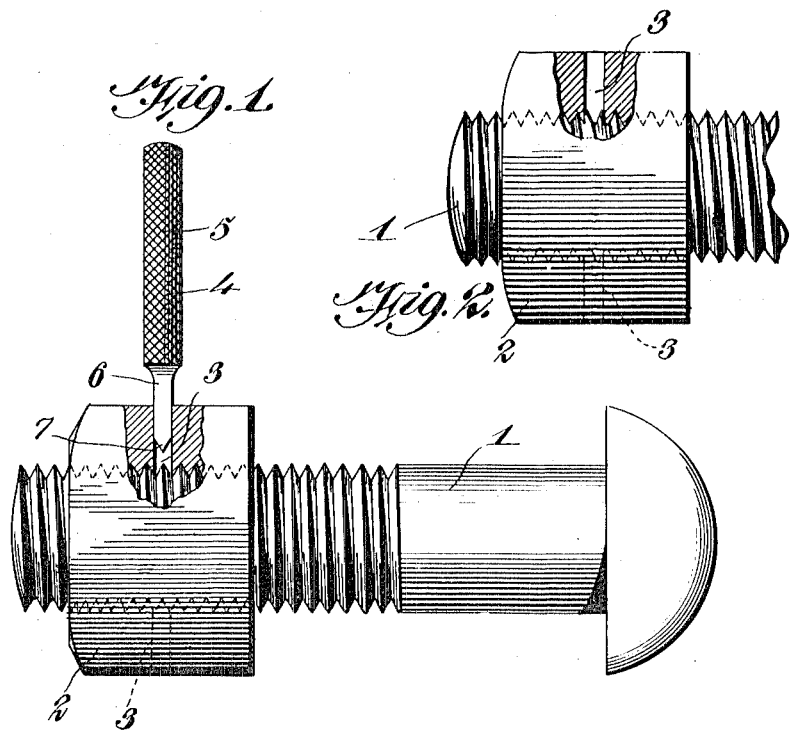

PERCY H. EATON, OF WESTVILLE, NOVA SCOTIA, CANADA.

LOCK-NUT.

1,116,253.　　　　Specification of Letters Patent.　　Patented Nov. 3, 1914.

Application filed March 18, 1913. Serial No. 755,187.

*To all whom it may concern:*

Be it known that I, PERCY H. EATON, a subject of the King of Great Britain, residing at Westville, in the Province of Nova Scotia and Dominion of Canada, have invented new and useful Improvements in Lock-Nuts, of which the following is a specification.

The present invention relates to a method and apparatus for securing a nut and bolt in interlocked position, so that the accidental separation of the said nut and bolt will be effectively prevented.

With the above recited objects in view, and others which will appear as the nature of the invention is more fully understood, the improvement resides in the construction, combination and operative arrangement of parts set forth in the following description and falling within the scope of the appended claim.

The essential features of the invention involved in carrying out my objects are necessarily susceptible to embodiment in various forms of construction without departing from the scope of the invention as defined by the appended claim, but certain preferred and practical embodiments are exemplified by the accompanying drawings, in which:

Figure 1 is an elevation, partly in section, illustrating the manner in which the nut is to be locked upon the bolt, Fig. 2 is a similar view showing the nut in locked position upon the bolt.

In carrying out my invention I employ an ordinary bolt 1 and an ordinary nut 2, which coöperates with the bolt. The nut may be provided with any desired number of sides or faces, and the nut is provided with a plurality of openings 3 which are arranged radially of the bore of the nut and which preferably are arranged upon each of the faces of the nut. The openings 3 may all be arranged in the same plane, or the opening upon one of the faces or sides of the nut may be arranged out of the plane with the openings in the remaining faces of the nut.

The numeral 4 designates a tool which is employed in carrying out my invention. This tool is constructed of some hard metal, being preferably formed from either harveyized or Krupp steel, and includes a milled handle 5 and a reduced stem 6 which is arranged at one of the ends of said handle, and which is of a size to permit of the same entering any of the openings 3. The shank 5 is formed with a substantially V-shaped end, as designated by the numeral 7, and the pointed edge of said end is curved or arcuate, as indicated by the numeral 8, so that the end will correspond to the circumferential bore of the nut as well as to the periphery of the threaded shank of the bolt. The shank 6 of the tool is of a length greater than the length of the openings 3 of the nut, and after the nut has been screwed home upon the bolt and the V-shaped end has its curved point properly arranged on the thread of the bolt which is disposed centrally of the said opening of the nut, a sharp blow is delivered upon the outer end of the tool 4 which causes its knife edge to forcibly contact with the said portion of the thread of the bolt to split the same and to cause the said thread to spread and to engage within the opening 3 of the nut. The spreading of the thread prevents the nut from turning in either direction by forces that usually cause the nuts to loosen and drop off the bolts. When it is desired to remove the nut or turn it farther upon the bolt, a wrench is applied to the nut and a strong pressure exerted thereon will force the severed portions of the thread back to their original position without serious injury to either the nut or the bolt, so that it may be used repeatedly without impairing their effectiveness. When bolts become loose through wear the nut can be advanced as described, the required distance, and again locked as before. This can also be done repeatedly without impairing the effectiveness of the nut or the bolt. When the tool 4 is arranged within one of the openings of the nut, before the entering or knife point of the tool is forced against the threads of the bolt to spread the said threads, the handle of the tool provides an effective lever whereby the nut may be rotated upon the bolt either in a homeward or in an unscrewing direction.

What I claim as new is:

A bolt and a nut screwed on the bolt, said nut having an opening which communicates with its bore and a portion of the thread of the bolt being split longitudinally to divide the same at the portion thereof arranged at the opening of the nut to cause the said divided portion of the thread to frictionally contact with the opposite walls of the opening to lock the nut upon the bolt.

In testimony whereof I affix my signature in presence of two witnesses.

PERCY H. EATON.

Witnesses:
J. G. MacKenzie,
Mert McKenzie.